United States Patent
Umemura et al.

(10) Patent No.: US 10,414,932 B2
(45) Date of Patent: Sep. 17, 2019

(54) INK, INK CONTAINER, AND INKJET RECORDING DEVICE

(71) Applicants: Kazuhiko Umemura, Shizuoka (JP); Hiroyuki Fushimi, Shizuoka (JP); Yoshihiro Moriya, Shizuoka (JP); Tamotsu Aruga, Shizuoka (JP)

(72) Inventors: Kazuhiko Umemura, Shizuoka (JP); Hiroyuki Fushimi, Shizuoka (JP); Yoshihiro Moriya, Shizuoka (JP); Tamotsu Aruga, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 159 days.

(21) Appl. No.: 15/278,917

(22) Filed: Sep. 28, 2016

(65) Prior Publication Data
US 2017/0107389 A1    Apr. 20, 2017

(30) Foreign Application Priority Data

Oct. 20, 2015 (JP) .................................. 2015-206264
Aug. 22, 2016 (JP) .................................. 2016-162100

(51) Int. Cl.
| | |
|---|---|
| C09D 11/38 | (2014.01) |
| C09D 11/322 | (2014.01) |
| B41J 2/175 | (2006.01) |
| C09D 103/08 | (2006.01) |

(52) U.S. Cl.
CPC .............. *C09D 11/38* (2013.01); *B41J 2/1752* (2013.01); *B41J 2/17523* (2013.01); *B41J 2/17553* (2013.01); *C09D 11/322* (2013.01); *C09D 103/08* (2013.01)

(58) Field of Classification Search
CPC ......... C09D 11/38; C09D 11/36; C09D 11/03; C09D 11/322; C09D 103/08; B41J 2/175; B41J 2/1752; B41J 2/17523; B41J 2/17553
See application file for complete search history.

(56) References Cited

U.S. PATENT DOCUMENTS

| | | | | |
|---|---|---|---|---|
| 7,976,146 | B2 * | 7/2011 | Sanada | C09D 11/30 347/100 |
| 2004/0069183 | A1 * | 4/2004 | Kamoto | C09D 11/40 106/31.27 |
| 2007/0166438 | A1 * | 7/2007 | Kitahata | B01J 20/103 426/242 |

(Continued)

FOREIGN PATENT DOCUMENTS

| | | |
|---|---|---|
| JP | 11-181341 | 7/1999 |
| JP | 2004-033928 | 2/2004 |

(Continued)

*Primary Examiner* — Thinh H Nguyen
(74) *Attorney, Agent, or Firm* — Oblon, McClelland, Maier & Neustadt, L.L.P.

(57) ABSTRACT

Ink includes water, a pigment, an organic solvent including glycol ether, and a surfactant including a silicone-based surfactant and a salt of sulfo succinic acid dialkyl ester. As measured by maximum bubble pressure technique at 23 degrees C., the dynamic surface tension of the ink at 15 msec is not greater than 31 mN/m and the difference between the dynamic surface tension of the ink at 15 msec and the dynamic surface tension of the ink at 1,500 msec is not greater than 4.0 mN/m.

16 Claims, 1 Drawing Sheet

(56) References Cited

U.S. PATENT DOCUMENTS

| | | | | |
|---|---|---|---|---|
| 2007/0252881 A1* | 11/2007 | Sanada | ............... | C09D 11/30 |
| | | | | 347/100 |
| 2008/0280043 A1* | 11/2008 | Moribe | ............... | C09D 11/40 |
| | | | | 427/256 |
| 2011/0050788 A1* | 3/2011 | Imamura | ............. | C09D 11/322 |
| | | | | 347/21 |
| 2011/0069108 A1* | 3/2011 | Fukuda | ............... | B41M 5/0023 |
| | | | | 347/20 |
| 2011/0234692 A1* | 9/2011 | Haijima | ............. | B41J 2/16552 |
| | | | | 347/28 |
| 2012/0232203 A1* | 9/2012 | Tomura | ............... | C09D 11/38 |
| | | | | 524/388 |
| 2013/0045342 A1* | 2/2013 | Soneta | ............... | B41M 5/5254 |
| | | | | 428/32.1 |
| 2014/0069295 A1* | 3/2014 | Fujii | ............... | C09D 11/322 |
| | | | | 106/31.78 |
| 2015/0035896 A1 | 2/2015 | Gotou et al. | | |
| 2016/0361914 A1* | 12/2016 | Wariishi | ............... | G03F 7/00 |

FOREIGN PATENT DOCUMENTS

| | | |
|---|---|---|
| JP | 2004-143387 | 5/2004 |
| JP | 2004-339282 | 12/2004 |
| JP | 2009057416 A * | 3/2009 |
| JP | 2013-189599 | 9/2013 |
| JP | 2014-051625 | 3/2014 |
| JP | 2015-044405 | 3/2015 |
| JP | 2015-515510 | 5/2015 |
| WO | WO2013/131924 A1 | 9/2013 |

* cited by examiner

INK, INK CONTAINER, AND INKJET RECORDING DEVICE

CROSS-REFERENCE TO RELATED APPLICATIONS

This patent application is based on and claims priority pursuant to 35 U.S.C. § 119 to Japanese Patent Application Nos. 2015-206264 and 2016-162100, filed on Oct. 20, 2015 and Aug. 22, 2016, respectively, in the Japan Patent Office, the entire disclosures of which are hereby incorporated by reference herein.

BACKGROUND

Technical Field

The present invention relates to ink, an ink container, and an ink jet recording device.

Description of the Related Art

Ink for use on plain paper and various kinds of coated paper is required to meet the demand for various quality and features and many developments and researches have been made to improve basic quality such as image density. In particular, the demand from the market is strong with regard to improvement on the image density of ink for inkjet on plain paper.

In general, to improve image density, reduction of dynamic surface tension is said to be good. Although static surface tension can be reduced by addition of a small quantity of additives such as fluorosurfactants and silicone-based surfactants, dynamic surface tension thereof is not easily decreased. This is because a surfactant forms a micelle in ink and the micelle is stabilized, so that the surfactant little or never contributes to reduction of dynamic surface tension. In particular, it is difficult to decrease dynamic surface tension by a fluororsurfactant.

In comparison with a fluorosurfactant, a silicone-based surfactant easily decreases dynamic surface tension by controlling molecular structures.

However, when a surfactant to decrease dynamic surface tension is added, static surface tension may be decreased excessively, which leads to making forming meniscus in a nozzle unstable or causing blurring or strike-through on paper.

On the other hand, acetylene glycol-based surfactants are known to reduce dynamic surface tension to a relatively-low level and make the difference between dynamic surface tension and static surface tension small.

Although an acetylene glycol-based surfactant demonstrates good features when the surfactant is used for dye-based ink, the surfactant tends to make dispersion of pigment unstable and cause defective discharging such as nozzle deviation due to agglomeration when the surfactant is used for pigment-dispersion-based ink. In addition, it is also known that ink to which such a surfactant is added tends not to wet-spread well on coated paper and film.

SUMMARY

According to the present invention, provided is an improved ink which includes water, a pigment, an organic solvent including glycol ether, and a surfactant including a silicone-based surfactant and a salt of sulfo succinic acid dialkyl ester. As measured by maximum bubble pressure technique at 23 degrees C., the dynamic surface tension of the ink at 15 msec is not greater than 31 mN/m and the difference between the dynamic surface tension of the ink at 15 msec and the dynamic surface tension of the ink at 1,500 msec is not greater than 4.0 mN/m.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
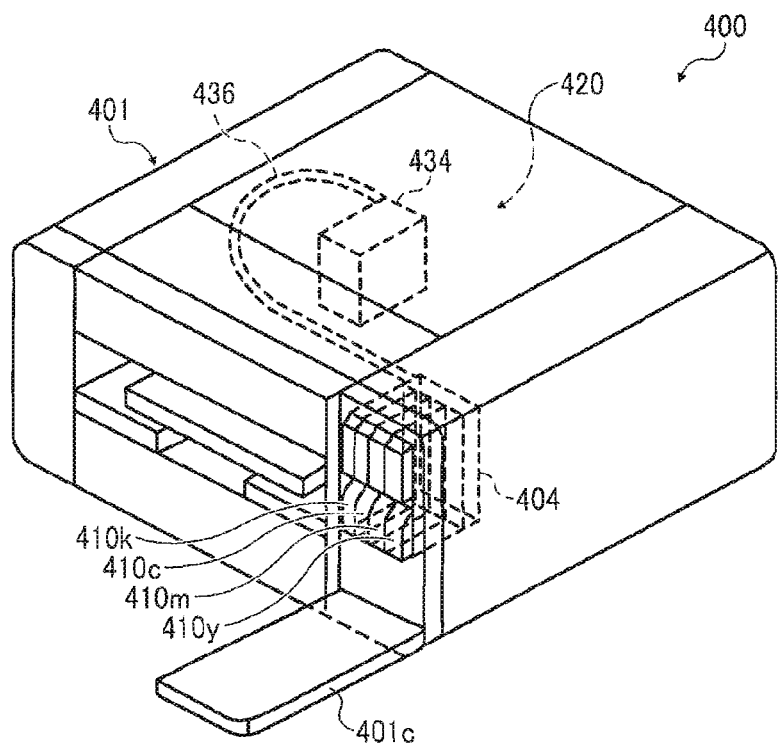
FIG. 1 is a diagram illustrating an example of the recording device using the ink of the present disclosure according to an embodiment of the present disclosure.

The accompanying drawings are intended to depict example embodiments of the present invention and should not be interpreted to limit the scope thereof. The accompanying drawings are not to be considered as drawn to scale unless explicitly noted.

DESCRIPTION OF THE EMBODIMENTS

The present disclosure provides ink having high image density.

Also, the present disclosure provides ink in which storage stability of pigment dispersed is improved.

Furthermore, the present disclosure provides ink having good discharging stability.

The ink of the present disclosure includes water, a pigment, an organic solvent including a glycol ether, and a surfactant including a silicone-based surfactant and a salt of sulfo succinic acid dialkyl ester.

The ink of the present disclosure can be accommodated in an ink container such as an ink cartridge to accommodate ink for usage. This ink container can be detachably attachable to various inkjet recording devices for usage.

To obtain high image density, the contact angle between an ink droplet and a medium has to be small in a short time immediately after the contact, so that the ink droplet easily spreads and covers the surface of the medium. Taking this into account, it is suitable that that the value of dynamic surface tension at 15 msec is small.

In the present disclosure, the value of dynamic surface tension of the ink at 15 msec is 31 mN/m or less as measured by maximum bubble pressure technique at 23 degrees C.

When the value is not greater than 31.0 mN/m, sufficient image density is obtained. More preferably, the value is 30.5 mN/m.

To suppress blurring and strike-through, it is preferable that the value of dynamic surface tension at 1,500 msec be large. Taking this into account, it is preferable that the difference between the dynamic surface tension at 15 msec and the dynamic surface tension at 1,500 msec be small.

In the present disclosure, the difference between the value of dynamic surface tension of the ink at 15 msec and the value of dynamic surface tension of the ink at 1,500 msec is 4.0 mN/m or less. It is preferably 3.5 mN/m or less.

To reduce dynamic surface tension, the surfactant added is freely dissolved without forming a micelle. This is the reason glycol ether is added.

Since glycol ether has good affinity with the lipophilic part of a surfactant, forming of a micelle of the surfactant in an aqueous solution is suppressed and arrangement of the surfactant on the surface of droplets in a short time is promoted.

The proportion of glycol ether is preferably 0.5-4.0 percent by mass. The proportion is more preferably 1.0-3.0 percent by mass. When the proportion is not less than 0.5 percent by mass, dynamic surface tension tends to be low. When the proportion is not greater than 4.0 percent by mass, ink quickly dries.

Specific examples of glycol ether include, but are not limited to, diethylene glycol monobutylether, tripropylene glycol monomethyl ether, and diethylene glycol monohexyl ether.

In particular, when glycol ether is diethylene glycol monohexyl ether, the value of dynamic surface tension is easily reduced due to a combination with a silicone-based surfactant so that images having high image density can be obtained.

In the case of a silicone-based surfactant, the amount of change of dynamic surface tension tends to be large. If the value at 15 msec is tried to be reduced, the value at 1,500 msec easily decreases.

For this reason, the ink of the present disclosure includes a salt of sulfo succinic acid dialkyl ester. Due to a combinational use with a salt of sulfo succinic acid dialkyl ester, the dynamic surface tension can be easily controlled.

The salt of sulfo succinic acid dialkyl ester preferably accounts for 0.1-2.0 percent by mass of the ink. Within this range, dynamic surface tension is reduced sufficiently and the difference to the static surface tension is not large.

The ink of the present disclosure preferably includes glycerin in an amount of 3.0-10.0 percent by mass.

When the proportion of glycerin in the ink is 3.0-10.0 percent by mass, it is possible to prevent excessive drying when applied to inkjet methods. More preferably, the proportion is preferably 5.0-8.0 percent by mass.

In the inkjet method, micro droplets of ink are discharged through micro nozzles to form images. During image forming, the nozzle is exposed to air and moves at high speed with a minute gap with the surface of paper maintained. Therefore, the ink in the nozzle is set in a state close to being dried with a reduced pressure, so that the ink is easily dried.

Glycerin is very suitable as a humectant and able to prevent the ink from being dried in the nozzle. In addition, when glycerin is used in the ink of the present disclosure, it is good to improve dispersion medium of the pigment in the ink. Inferentially, this is caused by steric barrier that prevents agglomeration of dispersed pigments.

In addition, the ink maintains its defoaming property due to inclusion of non-silicone-based defoaming agent. It is suitable to select a lipophilic defoaming agent having an HLB value of from about 3 to about 7. In the present disclosure, the silicone-based surfactant controls the surface tension of ink. In order not to inhibit the control of surface tension, it is preferable to add a non-silicone-based defoaming agent.

The proportion in mass ratio of the glycol ether in the ink is 1.0-3.0 when the total proportion in mass ratio of the silicone-based surfactant and the salt of sulfo succinic acid dialkyl ester in the ink is defined as 1.0.

Within the range of the mass ratio specified above, the ink of the present disclosure can stably maintain the surface tension, form images having high image density, and obtain good storage stability.

More preferably, it is 1.0:1.5-2.5.

The silicone-based surfactant has no specific limit and can be suitably selected to suit to a particular application. Of these, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group is particularly preferable because such an agent demonstrates good characteristics as an aqueous surfactant. It is also possible to use a polyether-modified silicone-based surfactant as the silicone-based surfactant. A specific example thereof is a compound in which a polyalkylene oxide structure is introduced into the side chain of the Si site of dimethyl siloxane.

Other surfactants can be optionally added unless they have an adverse impact on the present disclosure.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

Any suitably synthesized surfactant and any product available on the market is suitable as the silicone-based surfactant for use in the present disclosure. Products available on the market are obtained from Byk Chemie Japan Co., Ltd., Shin-Etsu Silicone Co., Ltd., Dow Corning Toray Co., Ltd., etc., NIHON EMULSION Co., Ltd., Kyoeisha Chemical Co., Ltd., etc.

Specific examples thereof include, but are not limited to, 500W, 501W, and 607 additive (all manufactured by Dow Corning Toray Co., Ltd.) and BYK-3400 (manufactured by Byk Chemie Japan Co., Ltd.).

Ink

The organic solvent, water, coloring material, resins, and additives for use in the ink are described next.

Organic Solvent

There is no specific limitation on the type of the organic solvent used in the present disclosure. For example, water-soluble organic solvents are suitable.

Specific examples thereof include, but are not limited to, polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

Since the water-soluble organic solvent serves as a humectant and also imparts a good drying property, it is preferable to use an organic solvent having a boiling point of 250 degrees C. or lower.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethylene glycol monomethylether, diethyleneglycol monoethylether, diethyleneglycol monobutylether, tetraethyleneglycol monomethylether, propyleneglycol monoethylether; and polyol arylethers such as ethyleneglycol monophenylether and ethyleneglycol monobenzylether.

The polyol compounds having eight or more carbon atoms and glycolether compounds enhance the permeability of ink when paper is used as a print medium.

The proportion of the organic solvent in ink has no particular limit and can be suitably selected to suit a particular application.

In terms of the drying property and discharging reliability of the ink, the proportion is preferably 10-60 percent by mass and more preferably 20-60 percent by mass.

Water

The proportion of water in the ink has no particular limit. In terms of the drying property and discharging reliability of the ink, the proportion is preferably 10-90 percent by mass and more preferably 20-60 percent by mass.

Coloring Material

The coloring material has no particular limit. For example, pigments and dyes are suitable.

The pigment includes inorganic pigments and organic pigments. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of these pigments, pigments having good affinity with solvents are preferable. Also, hollow resin particles and inorganic hollow particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The type of dye is not particularly limited and includes, for example, acidic dyes, direct dyes, reactive dyes, basic dyes. These can be used alone or in combination. Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in ink is preferably from 0.1 to 15 percent by mass and more preferably 1-10 percent by mass in terms of enhancement of image density, fixability, and discharging stability.

To obtain the ink, the pigment is dispersed by, for example, preparing a self-dispersible pigment by introducing a hydrophilic functional group into the pigment, coating the surface of the pigment with resin, or using a dispersant.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of the pigment with resin, the pigment is encapsulated by microcapsules to make the pigment dispersible in water. This can be referred to as a resin-coated pigment. In this case, the pigment to be added to ink is not necessarily coated with resin. Pigments partially or wholly uncovered with resin may be dispersed in the ink unless the pigments have an adverse impact.

To use a dispersant, for example, a known dispersant of a small molecular weight type or a high molecular weight type represented by a surfactant is used to disperse the pigments in ink.

As the dispersant, it is possible to use, for example, anionic surfactants, cationic surfactants, nonionic surfactants, amphoteric surfactants, etc. depending on the pigments.

Also, a nonionic surfactant (RT-100, manufactured by TAKEMOTO OIL & FAT CO., LTD.) and a formalin condensate of naphthalene sodium sulfonate are suitable as dispersants.

These dispersants can be used alone or in combination.

Pigment Dispersion

The ink can be obtained by mixing a pigment with materials such as water and organic solvent. It is also possible to mix a pigment with water, a dispersant, etc., first to prepare a pigment dispersion and thereafter mix the pigment dispersion with materials such as water and organic solvent to manufacture ink.

The pigment dispersion is obtained by mixing and dispersing water, pigment, pigment dispersant, and other optional components and adjusting the particle size. It is good to use a dispersing device for dispersion.

The particle diameter of the pigment in the pigment dispersion has no particular limit. For example, the maximum frequency in the maximum number conversion is preferably 20-500 nm and more preferably 20-150 nm to improve dispersion stability of the pigment and ameliorate the discharging stability and image quality such as image density.

The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the content is preferably from 0.1 to 50 percent by mass and more preferably 0.1-30 percent by mass.

During the production, coarse particles are optionally filtered off with a filter, a centrifuge, etc. preferably followed by degassing.

Resin

The type of the resin contained in the ink has no particular limit. Specific examples thereof include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Particles of such resins may be also used. It is possible to mix a resin emulsion in which the resin particles are dispersed in water serving as a dispersion medium with materials such as a coloring agent and an organic solvent to obtain ink. The resin particle can be synthesized or is available on the market. These can be used alone or in combination of the resin particles.

The volume average particle diameter of the resin particle is not particularly limited and can be suitably selected to suit to a particular application. The volume average particle diameter is preferably 10-1,000 nm, more preferably 10-200 nm, and furthermore preferably from 10 to 100 nm to obtain good fixability and image hardness.

The volume average particle diameter can be measured by using a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably 1-30 percent by mass and more preferably 5-20 percent by mass to the total content of the ink.

The particle diameter of the solid portion in ink has no particular limit. For example, the maximum frequency in the maximum number conversion is preferably 20-1,000 and more preferably 20-150 nm to ameliorate the discharging stability and image quality such as image density. The solid portion includes resin particles, particles of pigments, etc. The particle diameter of the solid portion can be measured by using a particle size analyzer (Nanotrac Wave-UT151, manufactured by MicrotracBEL Corp).

Additive

Ink may further optionally contain a surfactant, a defoaming agent, a preservative and fungicide, a corrosion inhibitor, a pH regulator, etc.

The proportion of the surfactant in ink is not particularly limited. It is preferably 0.001-5 percent by mass and more preferably 0.05-5 percent by mass ink in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable to easily break foams.

Preservatives and Fungicides

The preservatives and fungicides are not particularly limited. A specific example is 1,2-benzisothiazoline-3-on.

Corrosion Inhibitor

The corrosion inhibitor has not particular limit. Examples thereof are acid sulfite and sodium thiosulfate.

pH Regulator

The pH regulator has no particular limit. It is preferable to adjust the pH to 7 or higher. Specific examples thereof include, but are not limited to, amines such as diethanol amine and triethanol amine.

The property of the ink is not particularly limited. For example, viscosity, surface tension, pH, etc., are preferably in the following ranges.

The viscosity of the ink at 25 degrees C. is preferably 5-30 mPa·s and more preferably 5-25 mPa·s to improve print density and text quality and obtain good dischargeability. The viscosity can be measured by, for example, a rotatory viscometer (RE-80L, manufactured by TOKI SANGYO CO., LTD.). The measuring conditions are as follows:

Standard cone rotor (1°34'×R24)

Sample liquid amount: 1.2 mL

Number of rotations: 50 rotations per minute (rpm)

25 degrees C.

Measuring time: three minutes

The surface tension of the ink is preferably 35 mN/m or less and more preferably 32 mN/m or less at 25 degrees C. in terms that the ink is suitably levelized on a print medium and the drying time of the ink is shortened.

The pH of the ink is preferably 7-12 and more preferably 8-11 in terms of prevention of corrosion of metal materials contacting the ink.

Print Medium

The print medium for use in printing is not particularly limited. Plain paper, gloss paper, special paper, cloth, etc. are usable. Also, good images can be formed on a non-permeating substrate.

The non-permeating substrate has a surface with low moisture permeability and absorbency and includes a material having myriad of hollow spaces inside but not open to the outside. To be more quantitative, the substrate has a water-absorption amount of 10 mL/m² or less between the contact and 30 msec ½ after the contact according to Bristow method.

For example, plastic films of polyvinyl chloride resin, polyethylene terephthalate (PET), polypropylene, polyethylene, and polycarbonate are suitably used for the non-permeating substrate.

Printed Matter

The printed matter of the present disclosure includes a print medium and an image formed on the print medium with the ink of the present disclosure.

An inkjet printing device and an inkjet printing method are used to print the image on the print medium to obtain the printed matter.

Printing Device and Printing Method

The ink of the present disclosure can be suitably applied to various printing devices employing an inkjet printing method such as printers, facsimile machines, photocopiers, multifunction peripherals (serving as a printer, a facsimile machine, and a photocopier), and 3D model manufacturing devices (3D printers, additive manufacturing device).

In the present disclosure, the printing device and the printing method represent a device capable of discharging ink, various processing fluids, etc. to a print medium and a method printing an image on the print medium using the device. The print medium means an article to which the ink or the various processing fluids can be attached at least temporarily.

The printing device may further optionally include a device relating to feeding, transferring, and ejecting the print medium and other devices referred to as a pre-processing device, a post-processing device, etc. in addition to the head portion to discharge the ink.

The printing device and the printing method may further optionally include a heater for use in the heating process and a drier for use in the drying process. For example, the heating device and the drying device heat and dry the top surface and the bottom surface of a print medium having an image. The heating device and the drying device are not particularly limited. For example, a fan heater and an infra-red heater can be used. The print medium can be heated and dried before, during, and after printing.

In addition, the printing device and the printing method are not limited to those producing merely meaningful visible images such as texts and figures with the ink. For example, the printing device and the printing method can produce patterns like geometric design and 3D images.

In addition, the printing device includes both a serial type device in which the liquid discharging head is caused to move and a line type device in which the liquid discharging head is not moved, unless otherwise specified.

Furthermore, in addition to the desktop type, this printing device includes a wide type capable of printing images on a large print medium such as AO, a continuous printer capable of using continuous paper wound up in a roll form as print media.

Figure 2:
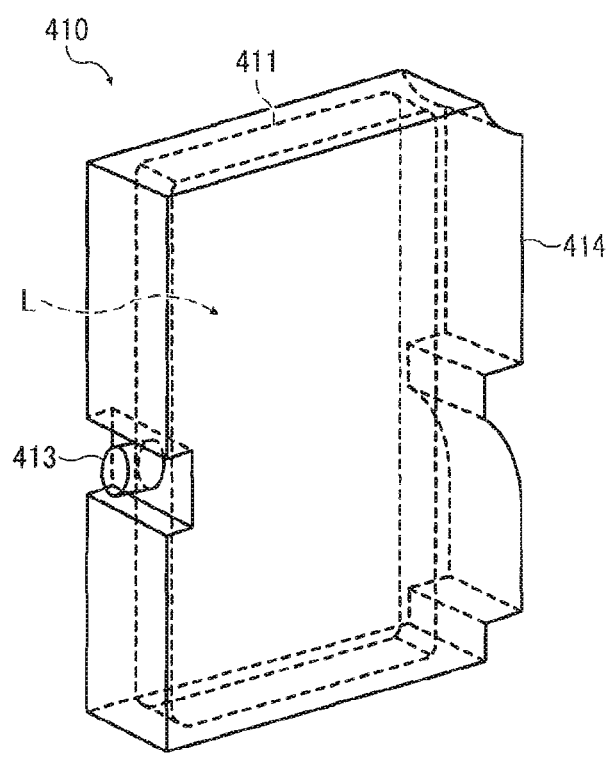
FIG. 2 is a perspective view of the main tank accommodating the ink of the present disclosure.

The printing device of the present disclosure is described using an example with reference to FIG. 1 and FIG. 2. FIG. 1 is a perspective view illustrating the image printing device. FIG. 2 is a perspective view illustrating the main tank. An image forming apparatus 400 as an example of the printing device is a serial type image forming apparatus. A mechanical unit 420 is disposed in an exterior 401 of the image forming apparatus 400. Each ink accommodating unit (ink container) 411 of each main tank 410 (410k, 410c, 410m, and 410y) for each color of black (K), cyan (C), magenta (M), and yellow (Y) is made of a packing member such as aluminum laminate film. The ink container 411 is, for example, accommodated in a plastic housing unit 414. As a result, the main tank 410 is used as an ink cartridge of each color.

A cartridge holder 404 is disposed on the rear side of the opening when a cover 401c is opened. The cartridge holder 404 is detachably attached to the main tank 410. As a result, each ink discharging outlet 413 of the main tank 410 is communicated with a discharging head 434 for each color via a supplying tube 436 for each color so that the ink can be discharged from the discharging head 434 to a print medium.

How to use the ink is not limited to the inkjet printing method. Specific examples of such methods other than the inkjet printing method include, but are not limited to, blade coating methods, gravure coating methods, bar coating methods, roll coating methods, knife coating methods, dip coating methods, die coating methods, and spray coating methods.

The applications of the ink of the present disclosure are not particularly limited. For example, the ink can be used for printed matter, a paint, a coating material, and foundation. The ink can be used to form two-dimensional texts and images and furthermore a three-dimensional solid object (3D modeling object) as a material for 3D modeling.

The apparatus for fabricating a three-dimensional object can be any known device with no particular limit. For example, the apparatus includes an ink container, a supplying device, and a discharging device, a drier, etc. The three-dimensional solid object includes an object manufactured by re-applying ink. In addition, the three-dimensional solid object can be manufactured by processing a structure having a substrate such as a print medium printed with the ink as a molded processed product. The molded processed product is fabricated by, for example, heating drawing or punching a structure or printed matter having a sheet-like form, film-like form, etc.

The molded processed product is suitable for what is molded after surface-decorating. Examples thereof are gauges or operation panels of vehicles, office machines, electric and electronic machines, cameras, etc.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Examples 1 to 8 and Comparative Examples 1 to 4

Preparation Example of Liquid Dispersion of Pigment

| | |
|---|---|
| Carbon Black: #40 (manufactured by Mitsubishi Chemical Corporation): | 15 parts |
| Compound represented by the following Chemical formula 1 (polyosyethylene (n = 40) β-naphtylether): | 10 parts |

-continued

Preparation Example of Liquid Dispersion of Pigment

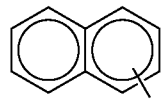

Chemical formula 1

Deionized water: 75 parts

After preliminarily mixing the mixture mentioned above, a liquid dispersion a of pigment was obtained by circulation dispersion by a disk-type bead mill (KDL type, manufactured by SHINMARU ENTERPRISES CORPORATION; Media: zirconia ball having a diameter of 0.3 mm).

Manufacturing of Ink

According to the prescription shown in Table 1, all the ingredients were placed in a container equipped with a stirrer and thereafter stirred for one and a half hours. The resultant was filtrated with a membrane filter having an opening hole diameter of 0.8 m to obtain inks of Examples 1-8 and Comparative Examples 1-4.

Each ingredient in Table 1 is as follows:

BYK-3400 and BYK-3455: Silicone-based surfactants, manufactured by Byk Chemie Japan Co., Ltd.

BYK-3400 includes the silicone-based surfactant and a salt of sulfo succinic acid dialkyl ester. Therefore, addition of BYK-3400 as ink component means addition of both a silicone-based surfactant and a salt of sulfo succinic acid dialkyl ester to ink.

W500 and 67 additive are silicone-based surfactants manufactured by Dow Corning Toray Co., Ltd.

SURFYNOL® 465 is an acetylene glycol-based surfactant manufactured by Nissin Chemical Industry Co., Ltd.

291-PG is a non-silicone-based surfactant manufactured by Nippon Nyukazai Co., Ltd.

AD-01 is a non-silicone-based defoaming agent manufactured by Nissin Chemical Industry Co., Ltd.

KF-353 is a silicon-based defoaming agent manufactured by Shin-Etsu Chemical Co., Ltd.

Evaluation Method of Ink

Image Forming

Images were formed by using an inkjet printer IPSiO SG3100, manufactured by Ricoh Company, ltd.

Dynamic Surface Tension

Dynamic surface tension was measured by utilizing DynoTester manufactured by SITA Messtechnik GmbH.

Static Surface Tension

Static surface tension was measured by using an automatic surface tensiometer (DY-300, manufactured by Kyowa Interface Science Co., LTD.).

Average Particle Diameter

The particle diameter (D50) of the ink was measured by using a particle size distribution measuring instrument (NANOTRAC UPA-EX150, manufactured by NIKKISO CO., LTD.)

Image Density

Image density was measured by using a spectrodensitometer (model 938, manufactured by X-Rite).

A document in which six 10 mm-square black solid patches were uniformly disposed was printed on MyPaper (manufactured by NBS Ricoh Co., Ltd.) using the inkjet printer mentioned above and image density of the black solid portions were measured. The print mode is "plain paper, fast" set on the driver installed on the printer.

Viscosity

Viscosity was measured at 25 degrees C. and 50 percent relative humidity (RH) by using a rheometer (MCR301, manufactured by Anton Paar Japan K.K.). The gap was set to 50 μm at a plain plate having a diameter of 5 cm. Viscosity at a shearing speed of 100 (1/s) was measured.

Discharging Stability

While changing the drive voltage of piezoelectric elements in order for the discharging amount of ink to be the same using the inkjet printer mentioned above, a sheet of chart created by MICROSOFT WORD 2000 in which solid images having an area ratio of 5 percent of an A4 size paper per color were printed on MyPaper (manufactured by NBS RICOH CO., LTD.). No disturbance of ink discharging was confirmed.

Thereafter, the maintaining cap of the printer was removed from the nozzle to make the nozzle in open state and the nozzle was left undone at 40 degrees C. and 10 percent RH for three hours.

Thereafter, the same chart was printed and disturbance of each nozzle was evaluated according to the following evaluation criteria. The print mode was: a modified mode in which "Plain Paper—Standard Fast" was modified to "no color calibration" from the user setting for plain paper by a driver installed on the printer.

Evaluation Criteria

G (Good): Discharged through all nozzles
A (Acceptable): Less than 10 nozzles failed to discharge
P (Poor): Not less than 10 nozzles failed to discharge The results are shown in Table 2.

TABLE 1

| Ingredient | | | Example 1 | 2 | 3 | 4 | 5 | 6 | 7 | 8 |
|---|---|---|---|---|---|---|---|---|---|---|
| Organic solvent | Glycerin | | 10.0 | 10.0 | 10.0 | 10.0 | 10.0 | | 10.0 | 10.0 |
| | Diethylene glycol | | 10.0 | 10.0 | 10.0 | 10.0 | 10.0 | 20.0 | 10.0 | 10.0 |
| | Glycol ether | Diethylene glycol monobutyl ether | | | | | | 2.0 | | 2.0 |
| | | Triethylene glycol monomethyl ether | 2.0 | | | | | | | |
| | | Diethylene glycol monohexyl | | 2.0 | 2.0 | 2.0 | 3.0 | 2.0 | 2.0 | |

TABLE 1-continued

| | | | | | | | | | | |
|---|---|---|---|---|---|---|---|---|---|---|
| Surfactant | Di-2-ethylhexyl sulfo succinic acid sodium | ether | 0.1 | 0.1 | 0.3 | 0.3 | 0.1 | 0.1 | 0.1 | *Memo |
| | Silicone-based surfactant | BYK-3400 | 1.0 | 1.0 | | | 1.0 | 1.0 | 1.0 | 1.0 |
| | | W500 | | | 0.5 | | | | | |
| | | 67additive | | | | 0.5 | | | | |
| | | BYK-3455 | | | | | | | | |
| | Acetylene glycol-based surfactant | SURFYNOL 465 | | | | | | | | |
| | Pigment Dispersion | | 40.0 | 40.0 | 40.0 | 40.0 | 40.0 | 40.0 | 40.0 | 40.0 |
| Defoaming agent | Non-silicone-baaed defoaming agent | 291-PG | | | | | | | | |
| | Silicone-baaed defoaming agent | Defoaming agent AD-01 | 0.1 | 0.1 | 0.1 | 0.1 | 0.1 | 0.1 | | 0.1 |
| | | Defoaming agent KF-353 | | | | | | | 0.1 | |
| | Water | | 36.8 | 36.8 | 37.1 | 37.1 | 35.8 | 34.8 | 36.8 | 36.9 |

| | | | Comparative Example | | | |
|---|---|---|---|---|---|---|
| Ingredient | | | 1 | 2 | 3 | 4 |
| Organic solvent | Glycerin | | 10.0 | 10.0 | 10.0 | 10.0 |
| | Diethylene glycol | | 10.0 | 10.0 | 10.0 | 10.0 |
| | Glycol ether | Diethylene glycol monobutyl ether | | | | |
| | | Triethylene glycol monomethyl ether | | | | |
| | | Diethylene glycol monohexyl ether | 1.0 | 1.0 | | 1.0 |
| Surfactant | Di-2-ethylhexyl sulfo succinic acid sodium | | 0.3 | | 0.3 | 0.5 |
| | Silicone-based surfactant | BYL-3400 | | | 1.0 | |
| | | W500 | | | | |
| | | 67additive | | | | |
| | | BYL-3455 | | | | 1.0 |
| | Acetylene glycol-based surfactant | SURFYNOL 465 | 1.0 | | | |
| | Pigment Dispersion | | 40.0 | 40.0 | 40.0 | 40.0 |
| Defoaming agent | Non-silicone-baaed defoaming agent | 291-PG | | 1.0 | | |
| | Silicone-baaed defoaming agent | Defoaming agent AD-01 | 0.1 | | 0.1 | 0.1 |
| | | Defoaming agent KF-353 | | | | |
| | Water | | 37.6 | 38.0 | 38.6 | 37.4 |

*Memo: BYK-3400 includes di-2-ethylhexyl sodium sulfo succinate.

TABLE 2

| | | Example 1 | Example 2 | Example 3 | Example 4 | Example 5 | Example 6 |
|---|---|---|---|---|---|---|---|
| Initial property | Dynamic surface tension (15 msec) (mN/m) | 30.0 | 29.5 | 30.4 | 29.8 | 29.3 | 29.0 |
| | Dynamic surface tension (1,500 msec) (mN/m) | 26.5 | 27.0 | 26.8 | 26.4 | 26.9 | 26.0 |
| | Difference between dynamic surface tensions | 3.5 | 2.5 | 3.6 | 3.4 | 2.4 | 3.0 |
| | Static surface | 26.8 | 27.3 | 25.2 | 25.1 | 27.2 | 26.5 |

TABLE 2-continued

|  |  |  |  |  |  |  |  |
|---|---|---|---|---|---|---|---|
|  | tension |  |  |  |  |  |  |
|  | Average particle diameter (nm) | 90.4 | 88.6 | 89.8 | 90.2 | 92.2 | 95.1 |
|  | Image Density | 1.38 | 1.41 | 1.38 | 1.40 | 1.42 | 1.43 |
|  | Viscosity (mPa · s) | 8.1 | 8.0 | 7.9 | 8.1 | 8.4 | 8.7 |
|  | Discharging stability | G | G | G | G | G | G |
| 40 degrees C. after one month | Average particle diameter (nm) | 90.6 | 90.1 | 88.7 | 91.5 | 91.8 | 96.2 |
|  | Viscosity (mPa · s) | 8.2 | 8.1 | 8.0 | 8.7 | 8.6 | 8.8 |

|  |  | Example 7 | Example 8 | Comparative Example 1 | Comparative Example 2 | Comparative Example 3 | Comparative Example 4 |
|---|---|---|---|---|---|---|---|
| Initial property | Dynamic surface tension (15 msec) (mN/m) | 29.5 | 30.5 | 29.5 | 29.1 | 32.5 | 30.5 |
|  | Dynamic surface tension (1,500 msec) (mN/m) | 25.8 | 26.6 | 27.0 | 27.2 | 28.1 | 25.0 |
|  | Difference between dynamic surface tensions | 3.7 | 3.9 | 2.5 | 1.9 | 4.4 | 5.5 |
|  | Static surface tension | 26 | 26.9 | 27.5 | 27.5 | 26.5 | 23 |
|  | Average particle diameter (nm) | 90.5 | 90.5 | 93.5 | 88.9 | 93.1 | 90.8 |
|  | Image Density | 1.41 | 1.35 | 1.38 | 1.40 | 1.25 | 1.29 |
|  | Viscosity (mPa · s) | 7.9 | 8.1 | 8.2 | 8.1 | 7.8 | 8.1 |
|  | Discharging stability | G | G | P | G | A | G |
| 40 degrees C. after one month | Average particle diameter (nm) | 90.4 | 90.7 | 105 | 310 | 94.0 | 92.5 |
|  | Viscosity (mPa · s) | 8.1 | 8.2 | 8.8 | 25.0 | 7.6 | 7.8 |

As seen in Table 2, image density is high when using the ink of the present disclosure and viscosity and granularity of the ink little or never change during storage.

Also, discharging stability of the ink is excellent.

Viscosity and granularity of the ink of the present disclosure are stable during storage and discharging stability of the ink is excellent. In addition, images having high image density can be formed by using the ink of the present disclosure.

According to the present invention, a material set for manufacturing a glass object is provided to manufacture a glass object having excellent transparency, good dimension accuracy, and excellent strength.

Moreover, image forming, recording, printing, etc. in the present disclosure represent the same meaning.

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink, comprising:
   water;
   a pigment;
   a non-silicone-based defoaming agent;
   an organic solvent comprising glycol ether; and
   a surfactant comprising a silicone-based surfactant and a salt of sulfo succinic acid dialkyl ester, wherein the salt of sulfo succinic acid dialkyl ester is di-2-ethylhexyl sodium sulfo succinate,
   wherein as measured by maximum bubble pressure technique at 23 degrees C., a difference between the dynamic surface tension of the ink at 15 msec and a dynamic surface tension of the ink at 1,500 msec is not greater than 4.0 mN/m and the dynamic surface tension of the ink at 15 msec is not greater than 31 mN/m, and
   wherein
   an amount of glycol ether is from 1.0 to 3.0% by mass of the ink, and
   the glycol ether is selected from the group consisting of diethylene glycol monobutylether, triethylene glycol monomethyl ether, and diethylene glycol monohexyl ether.

2. The ink according to claim 1, further comprising glycerin, wherein the glycerin is present in an amount of 3.0-10.0 percent by mass of the ink.

3. The ink according to claim 1, wherein the salt of sulfo succinic acid dialkyl ester is present in an amount of 0.1-2.0 percent by mass of the ink.

4. An ink container, comprising:
   the ink according to claim 1.

5. An inkjet recording device comprising:
   the ink container of claim 4; and
   a discharging device configured to discharge ink supplied from the ink container of claim 4.

6. The ink according to claim 1, wherein the amount of glycol ether is from 1.0 to 2.0% by mass of the ink.

7. An ink, comprising:
   water;
   a pigment;
   an organic solvent comprising glycol ether; and
   a surfactant comprising a silicone-based surfactant and a salt of sulfo succinic acid dialkyl ester, wherein the salt of sulfo succinic acid dialkyl ester is di-2-ethylhexyl sodium sulfo succinate, wherein as measured by maximum bubble pressure technique at 23 degrees C., a difference between the dynamic surface tension of the ink at 15 msec and a dynamic surface tension of the ink at 1,500 msec is not greater than 4.0 mN/m and the dynamic surface tension of the ink at 15 msec is not greater than 31 mN/m, and wherein an amount of glycol ether is from 1.0 to 3.0% by mass of the ink, and the glycol ether comprises diethylene glycol monohexyl ether.

8. The ink according to claim 7, further comprising glycerin, wherein the glycerin is present in an amount of 3.0-10.0 percent by mass of the ink.

9. The ink according to claim 7, wherein the salt of sulfo succinic acid dialkyl ester is present in an amount of 0.1-2.0 percent by mass of the ink.

10. An ink container, comprising the ink according to claim 7.

11. An inkjet recording device comprising:
the ink container of claim 10; and
a discharging device configured to discharge ink supplied from the ink container of claim 10.

12. An ink, comprising:
water;
a pigment;
an organic solvent comprising glycol ether; and
a surfactant comprising a silicone-based surfactant and a salt of sulfo succinic acid dialkyl ester, wherein the salt of sulfo succinic acid dialkyl ester is di-2-ethylhexyl sodium sulfo succinate, wherein as measured by maximum bubble pressure technique at 23 degrees C., a difference between the dynamic surface tension of the ink at 15 msec and a dynamic surface tension of the ink at 1,500 msec is not greater than 4.0 mN/m and the dynamic surface tension of the ink at 15 msec is not greater than 31 mN/m, and wherein an amount of glycol ether is from 1.0 to 3.0% by mass of the ink, and the glycol ether is selected from the group consisting of diethylene glycol monobutylether, triethylene glycol monomethyl ether, and diethylene glycol monohexyl ether, and a proportion in mass ratio of the glycol ether in the ink is 1.0-3.0 when a total proportion in mass ratio of the silicone-based surfactant and the salt of sulfo succinic acid dialkyl ester in the ink is defined as 1.0.

13. The ink according to claim 12, further comprising glycerin, wherein the glycerin is present in an amount of 3.0-10.0 percent by mass of the ink.

14. The ink according to claim 12, wherein the salt of sulfo succinic acid dialkyl ester is present in an amount of 0.1-2.0 percent by mass of the ink.

15. An ink container, comprising the ink according to claim 12.

16. An inkjet recording device comprising:
the ink container of claim 15; and
a discharging device configured to discharge ink supplied from the ink container of claim 15.

* * * * *